March 14, 1967 C. S. ASHCRAFT 3,308,715

PROJECTION SYSTEM AND EQUIPMENT

Original Filed Feb. 12, 1963 4 Sheets-Sheet 1

INVENTOR.
CLARENCE S. ASHCRAFT
BY Kenyon & Kenyon
ATTORNEYS

INVENTOR.
CLARENCE S. ASHCRAFT
BY
Kenyon & Kenyon
ATTORNEYS

INVENTOR.
CLARENCE S. ASHCRAFT

BY Kenyon & Kenyon
ATTORNEYS

March 14, 1967 C. S. ASHCRAFT 3,308,715

PROJECTION SYSTEM AND EQUIPMENT

Original Filed Feb. 12, 1963 4 Sheets-Sheet 4

INVENTOR
CLARENCE S. ASHCRAFT

BY Kenyon & Kenyon
ATTORNEYS

United States Patent Office 3,308,715

Patented Mar. 14, 1967

3,308,715

PROJECTION SYSTEM AND EQUIPMENT

Clarence S. Ashcraft, Fort Lauderdale, Fla., assignor to C. S. Ashcraft Manufacturing Co., Inc., Long Island City, N.Y., a corporation of New York

Continuation of application Ser. No. 257,895, Feb. 12, 1963. This application Nov. 1, 1965, Ser. No. 514,439

4 Claims. (Cl. 88—24)

This is a continuation of my pending application S.N. 257,895, filed Feb. 12, 1963.

This invention relates in general to a light projection system. More particularly this invention relates to a light projection system which is used to improve motion picture film projection.

Present motion picture film projection systems fail to produce an image on the screen that adequately matches or adequately justifies the highly refined and highly expensive process which provides a picture, on the film, having excellent image contrast and uniformity. The picture projected from even the best of films has, in general, inadequate illumination, poor image contrast, uneven distribution of illumination over the surface of the screen, and less than ideal image resolution (focus).

In addition, there is the serious problem of film damage that arises from hot spots beamed onto the film. The hot spot problem is related to the problem of the uniformity of light distribution over the screen.

There are many projection system parameters which relate to, and in part measure, the above-mentioned characteristics of a projected image on a screen. Because the manipulation of any one of these characteristics involves a necessary change in the other characteristics, the various projection system characteristics are closely inter-related. Characteristics such as lens speed, focal length, depth of focus, vignetting, light source intensity, angle of collection, working distance and the various other projection system parameters are thus all closely inter-related.

To avoid unnecessarily complex theoretical description, it becomes necessary to select, on a somewhat arbitrary basis, some major characteristic of the projection system and relate it to the other characteristics taken one or two at a time. In this fashion a fairly comprehensive understanding of the prior art and, more importantly, of the improvements introduced by this invention may be had. It should then be understood that for the purposes of describing the theory and functional improvements, this application will speak primarily of first order effects and of those inter-relationships between factors which are of the greatest importance in highlighting the distinction between the structure of this invention and the prior art.

In accordance with the above approach, we will consider the total illumination that reaches the screen as the fundamental characteristic to which other factors and characteristics will be related. A major problem with the present systems is that much of the available generated light is lost in that it never reaches the screen. The second major system characteristic to which other factors and characteristics will be related is the uniformity of light distribution at the plane of the film and the plane of the screen. It is, of course, desirable to lose as little light as possible and to have as even a distribution of the light intensity as is possible.

Accordingly, it is an important purpose of this invention to devise a light projection system which will increase the light use efficiency in film projection.

It is another important purpose of this invention to increase the uniformity of light distribution over the surface of the screen in a film projection system.

It is another purpose of this invention to decrease the danger of film damage from hot spots.

It is also a purpose of this invention to provide a flexible system in that the portion of the reflecting mirror that is used may be varied and thus the interior angle of the cone of light may be varied.

It is another purpose of this invention to provide improvement in the image contrast and image resolution on the screen.

It is a further object of this invention to provide the above improvements while retaining the use of standard mirrors, standard carbons, standard lenses and standard apertures so that the improved system can be incorporated into present installations and may be manufactured from presently available components.

It is another purpose of this invention, related to the improvement in light efficiency, to increase the economic operating efficiency of film projection systems.

In brief, this invention provides an entirely new system of projection by a particular rearrangement of the relative distances between the standard elements of a projection system. Thus a standard ellipsoidal mirror is used to reflect the light provided by the so-called carbon arc. However, unlike the prior art, the crater face of the carbon rod may be significantly moved off the geometric focus of the mirror. Similarly, the ellipsoidal mirror is used to project the light onto the film at the film aperture but the film aperture is moved an appreciable distance toward the mirror and thus off the secondary focus of the ellipsoidal mirror. The light, having passed through the film, is next, as is standard, fed through the projection lens to be directed onto the screen. However, in this invention, the cone of light enters the lens aperture as a converging cone rather than as a diverging cone. The compression of the working distance between the film aperture and the mirror makes this latter change in lens location possible. Thus, in structural terms, the invention provides for a projection system in which all the elements of the actual projection system (the screen in this sense not being part of the projection system as such) are located along a single converging beam of light rather than a longer beam of light which first converges and then diverges. The simplest and briefest way of pointing out the fundamental distinction between this invention and the prior art is to contrast, in this fashion, the cone of light in both systems.

Further objects and purposes of this invention will become apparent from a consideration of the following detailed description of the prior art projection system and of the invention, in which.

Figure 1:
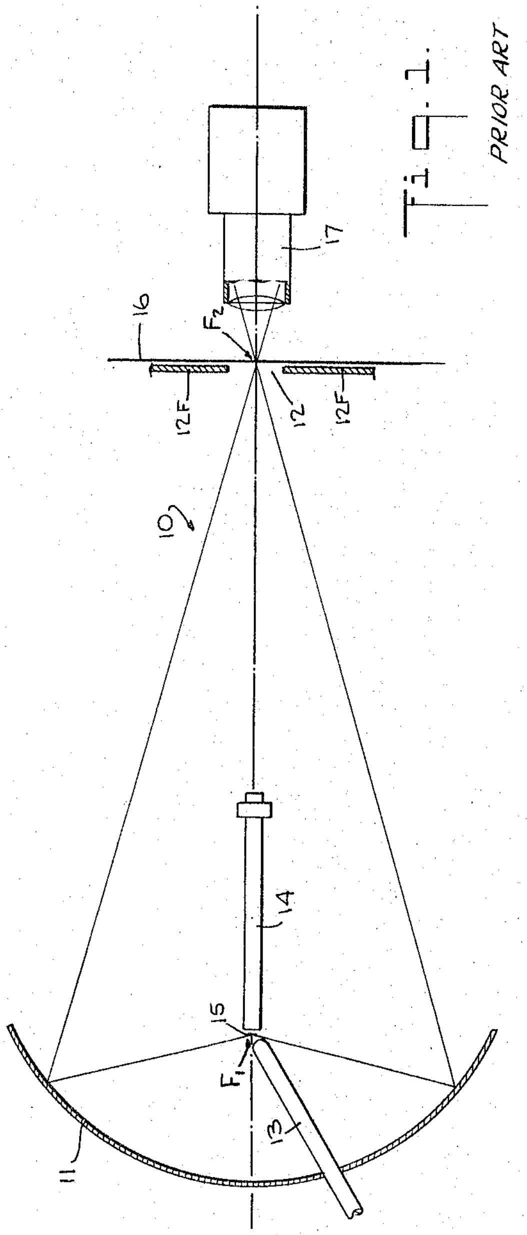
FIG. 1 is an optical schematic of the typical prior art system.
Figure 2:
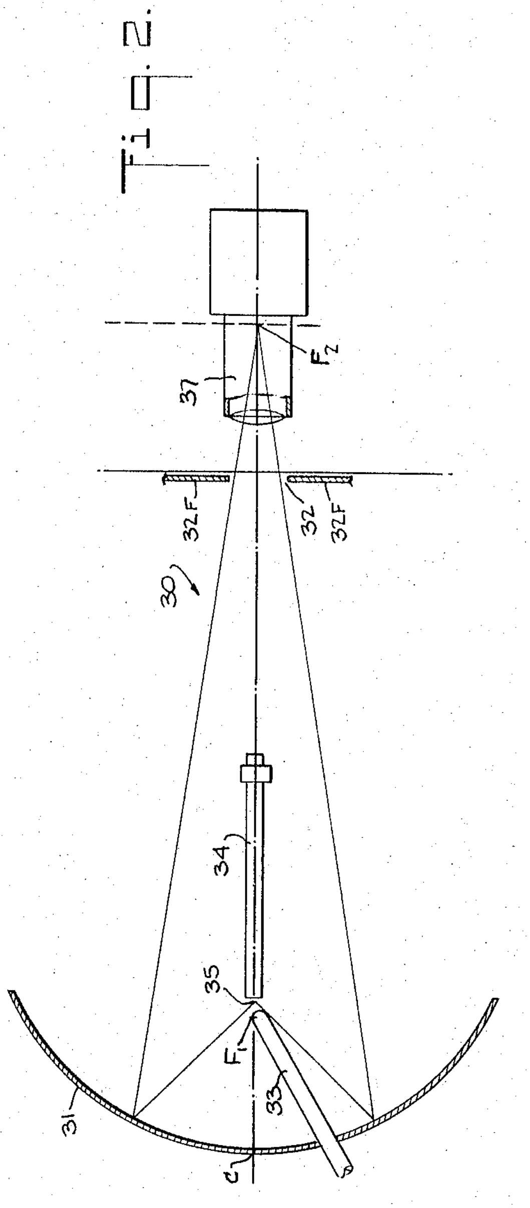
FIG. 2 is an optical schematic of the system of this invention.

With reference to the figures, FIGS. 1 and 2 permit a ready contrast between the prior art system and the system of this invention. Both figures contain the same basic elements. The numerals used for the same elements in the two systems will be distinct so as to reduce ambiguity in the description, though a certain degree of parallelism between the numerals used in FIG. 1 and FIG. 2 will be maintained for convenience.

*The prior art*

In the prior art projection system 10, the mirror 11 reflects light toward a film aperture 12. The source of light is an electric arc between a negative carbon rod 13 and a positive carbon rod 14. In operation the face 15 of the positive carbon rod 14 becomes highly concave and is referred to as a crater.

Figure 1A:
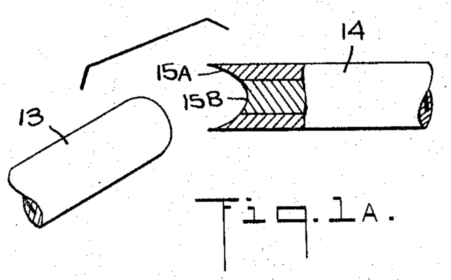
FIG. 1A is an enlarged longitudinal cross section of the carbons in FIG. 1 showing the typical crater developed during use in the prior art system.

As may be seen best in FIG. 1A, the crater 15 is composed of a shell 15A and a core 15B. The core 15B is a cerium core which provides an intense white light, when excited by an electric arc, the light thereby provided approximating the spectrum of light emitted by the sun. The shell 15A is a carbon shell which is used for structural purposes since the cerium core 15B could not be used without some sort of a shell to hold it together. The shell 15A also provides light but the light provided by the shell 15A is not nearly as bright, nor as white and homogenous as the light provided by the cerium core 15B. In the prior art systems the shell 15A light was reflected by the mirror 11 and formed part of the light which illuminated the film 16 at the aperture 12. Part of the reason for the uneven lighting in the prior art of the film 16 stems from the fact that the shell 15A light is not nearly as intense nor as white as the core 15B light.

The light generated by striking an arc between the carbon rods 13, 14 is fairly complex in form but is well known to the art. The brightest and whitest and most homogenous portion of the light created when an arc is struck is provided by what has been called a "gas ball" that exists just in front of the cerium core 15B. Applicant believes it is more accurate to describe the cerium core emanations as a short column. The face of this column is a disk that provides the intense white light desired and will be referred to herein alternately as a gas disk or disk.

In prior art systems it is important that this disk be located close (usually within ⅛ of an inch) to the geometric focus of the ellipsoidal mirror 11. If the crater face 15 is moved so that the resulting disk is off of the geometric focus, certain chromatic aberrations will occur in the ultimate picture. It is an important purpose of this invention to reduce the criticality of the carbon rod 13, 14 location and thus to introduce a measure of flexibility into the projection system 10.

It is a closely related purpose of this invention to use as much of the light from the gas disk as is possible but to avoid projecting any shell 15A light onto the film 16. The use of light from the core 15B alone avoids the problem of chromatic aberration and permits the flexibility that will be later described.

A large portion of the light emitted by this crater face 15 is collected by the ellipsoidal mirror 11 and is projected onto the film 16. When the crater face 15 is at the primary focus $F_1$ of the ellipsoidal mirror 11, the mirror 11 will project an image of that crater face 15 at a secondary focus $F_2$. In the prior art design, the film aperture 12 and film 16 are located approximately at the secondary focus $F_2$ of the ellipsoidal mirror 11 to be illuminated by a magnified image of the crater face 15. The light cone converges from the ellipsoidal mirror 11 toward the secondary focus $F_2$ and then proceeds to diverge. Thus the projection lens 17, which must of necessity be located on the screen side of the aperture frame 12F, receives a diverging cone of light. The lens 17 then refocuses the diverging cone of light in order to project it towards a screen on which the image will appear. For the purposes of this application, all of the elements from the mirror 11 through the lens 17 will be considered the projection system 10.

This prior art system 10 is inefficient in its use of light for a number of reasons, all of which cannot be described in detail without a fairly extensive analysis of projection theory. However, those skilled in the art will realize that the following discussion mentions the more significant factors in the loss of light.

The diverging cone of light between the aperture 12 and the entering aperture to the projection lens 17 is not all collected by the lens 17. The light thus lost simply passes by the edge of the projection lens 17 or, more accurately, is in large part absorbed and/or reflected by the frame around the projection lens 17. An increase in lens 17 diameter, so as to collect more light and thus provide a faster lens, is precluded for a number of reasons including cost, the additional focusing problems that a faster lens introduces, and the fact that such a lens would, unless other compensations were made, increase the unevenness of the light distribution on the screen.

In addition, vignetting of the light within the complex projection lens 17 results in further loss of light.

In addition to light loss, the light that does reach the screen is unevenly distributed over the screen Typically, the light intensity at the edges of the screen is 50 to 60% of the light intensity at the center of the screen. A major cause of this uneven distribution is the fact that the magnified projection of the core 15B at the secondary focus $F_2$ has a diameter which is significantly less than that of the film aperture 12. Thus the light image created at the plane of the film 16 is concentrated at the center of each frame of film 16. By placing the crater face 15 slightly off focus, the prior art systems were able to spread the light from the crater face 15 over the entire film 16 but not with the desired evenness so that the screen image, in the prior art, was nearly twice as bright at its center than at its edges.

In this prior art system 10 it is impossible to move the crater face 15 out of the geometric focus by more than a very small extent without causing certain chromatic aberrations. Moving the crater face 15 closer to the ellipsoidal mirror 11 creates a brownish-red ring in the light projected on the film 16. Moving the crater face 15 away from the mirror 11 creates bluish rings in the light projected on the film 16. These chromatic aberrations are because the mirror 11 will in fact be focusing light from the carbon arc that is generated at a spot other than the cerium created gas disk. This non-gas disk light is neither as intense as the light of the gas disk nor does it have the same spectrum distribution as the light of the gas disk.

The point at which the prior art system 10 locates the gas disk will be called herein the primary focus $F_1$. This simplified discussion of the prior art will treat the primary focus $F_1$ as being the geometric focus of the mirror 11, unless the discussion clearly make a distinction. It is to be understood, however, that the gas disk is in fact located off the geometric focus (usually in front of the geometric focus by ⅛ of an inch and occasionally by more). The geometric focus in the standard mirror 11 in use is approximately 6.5 inches from the mirror 11 center C.

This simplified discussion will also treat the secondary focus $F_2$ as being the location of the aperture frame 12F. The distance from the mirror 11 center C to the aperture frame 12F is called the working distance (WD) and in the prior art has usually been between 36 and 38 inches long.

*The invention*

In the projection system 30 of this invention, the ellipsoidal mirror 31 has the same parameters as the standard ellipsoidal mirror 11 used in the prior art system 10. Thus the mirror 31 has the standard geometric focus which is about 6.5 inches from the mirror along the projection axis. However, in this novel system 30, the aperture frame 32F is not located at the secondary focus $F_2$ but is moved in towards the mirror 31 (by about six and one-half inches in one preferred embodiment). Thus a working distance of about 29.5 inches from the center C of the mirror 31 has been found preferable in this invention where a standard 35 mm. aperture and lens system is used.

The negative carbon rod 33 and positive carbon rod 34 are exactly the same as those used in the prior art and are deployed in exactly the same fashion. The film 36 is fed directly behind the aperture frame 32F and is in virtually the same plane as the plane of the aperture frame 32F.

The distance between the aperture 32 and the entering aperture to the projection lens 37 is kept approximately the same, normally about 2⅜ inches. The 2⅜ inch back focus of the lens 37 should not be as critical in the invention as in the prior art because the lens 37 will be focusing a cone of light which is converging and in which the marginal rays are at less of an angle to the projection axis than in the prior art systems.

Since the aperture 32 has been moved in from the conjugate focus by six and one-half inches, the projection lens 37 has its opening aperture on the mirror side of the secondary focus $F_2$ and thus receives a converging beam of light. This converging beam of light on the projection lens 37 eliminates two of the major sources of light inefficiency. No light is lost because of divergence past the lens and there is less vignetting within the lens 37 structure.

Because the aperture frame 32F and thus the film 36 can be considerably moved away from the secondary focus $F_2$, the design of this system 30 is not nearly as limited by the geometry of the ellipsoidal mirror 31 as in the prior art system 10. Thus adjustments can be made, including an adjustment in the location of the aperture frame 32F so that the entire beam of light will impinge upon the projection lens 37. In addition, the fact that the impinging beam of light on the lens 37 is converging, instead of diverging, means that there will be considerably less loss due to vignetting within the projection lens system 37.

One of the highlights of the system 30 of this invention is the relative freedom it gives from the necessity to place certain elements as close as possible to the geometric focus $F_1$ and the secondary focus $F_2$. Not only is the aperture frame 32F freed from its bonds to the secondary focus $F_2$, but the crater face 35 is freed from its bonds to the geometric focus $F_1$.

FIGS. 1 and 2 illustrate the cone of light as having a larger base on the mirror 11 in the old system 10 than on the mirror 31 in the new system 30. This is because the cone of light in the two systems is drawn to reflect thte usable light, that is the light that actually gets through the aperture to impinge on the film 16. In the prior art system, light from the shell 15A as well as light from the gas disk generated by the core 15B was used to illuminate the film and thus the base of the effective cone of light included shell 15A radiations. In the new system 30, the light that impinges on the film 36 is substantially from the gas disk in the crater 35 of the positive carbon 34 and thus it is only the cone illustrating the light from the cerium core 15B of the carbon 34 which is illustrated, resulting in the smaller cone of light as illustrated.

Because the mirror 31 no longer focuses an image of whatever is at its geometric focus $F_1$ onto the film 36, the above-mentioned problems involving chromatic aberration are avoided. Accordingly, the gas disk at the crater face 35 can be moved much further away from the geometric focus $F_1$ than was possible in the prior art, to permit a ready adjustment of the base diameter and converging angle of the light cone. The ellipsoidal mirror 31 is still exposed to the intensely bright white light from the cerium core 35B and thus still serves as a fully effective medium to project that light toward the aperture 32 and film 36.

It becomes useful in this new system 30 to consider the light of the gas disk on the mirror 31 as the source of light. The ellipsoidal mirror 31 therefore serves not so much to focus the gas disk at the crater face 35 as to direct the light from the gas disk toward the film 36. The diameter of the light from the gas disk on the mirror 31 can be increased or decreased by changing the position of the crater face 35.

Figure 3:
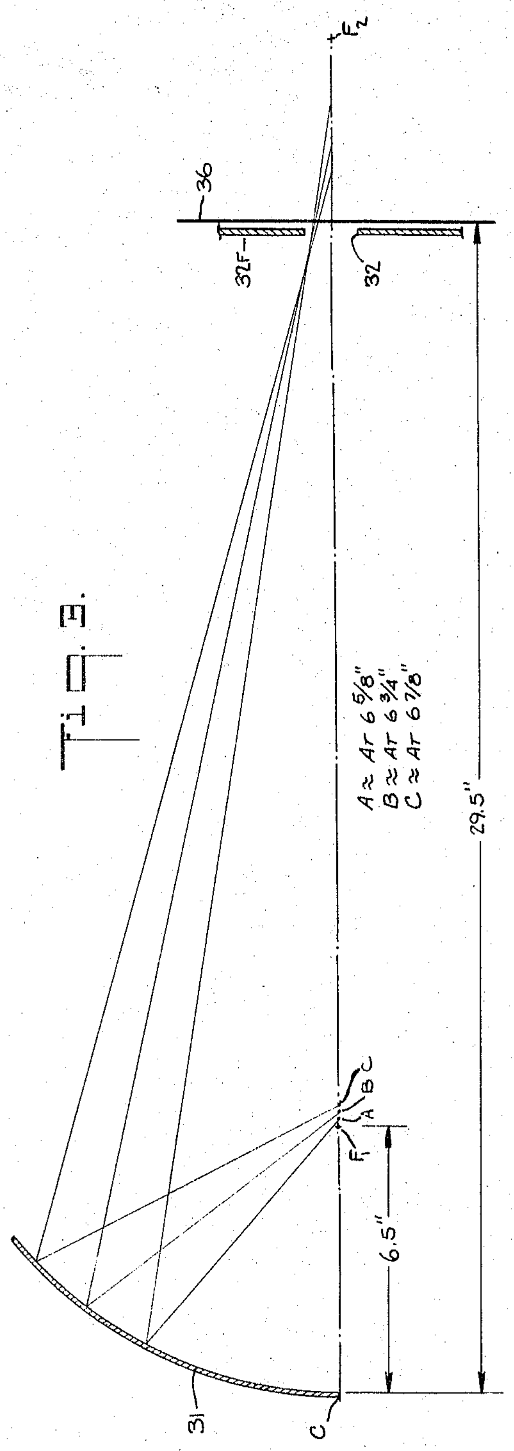
FIG. 3 is a schematic drawing of a portion of FIG. 2, illustrating the results of varying carbon positions.
Figure 8:
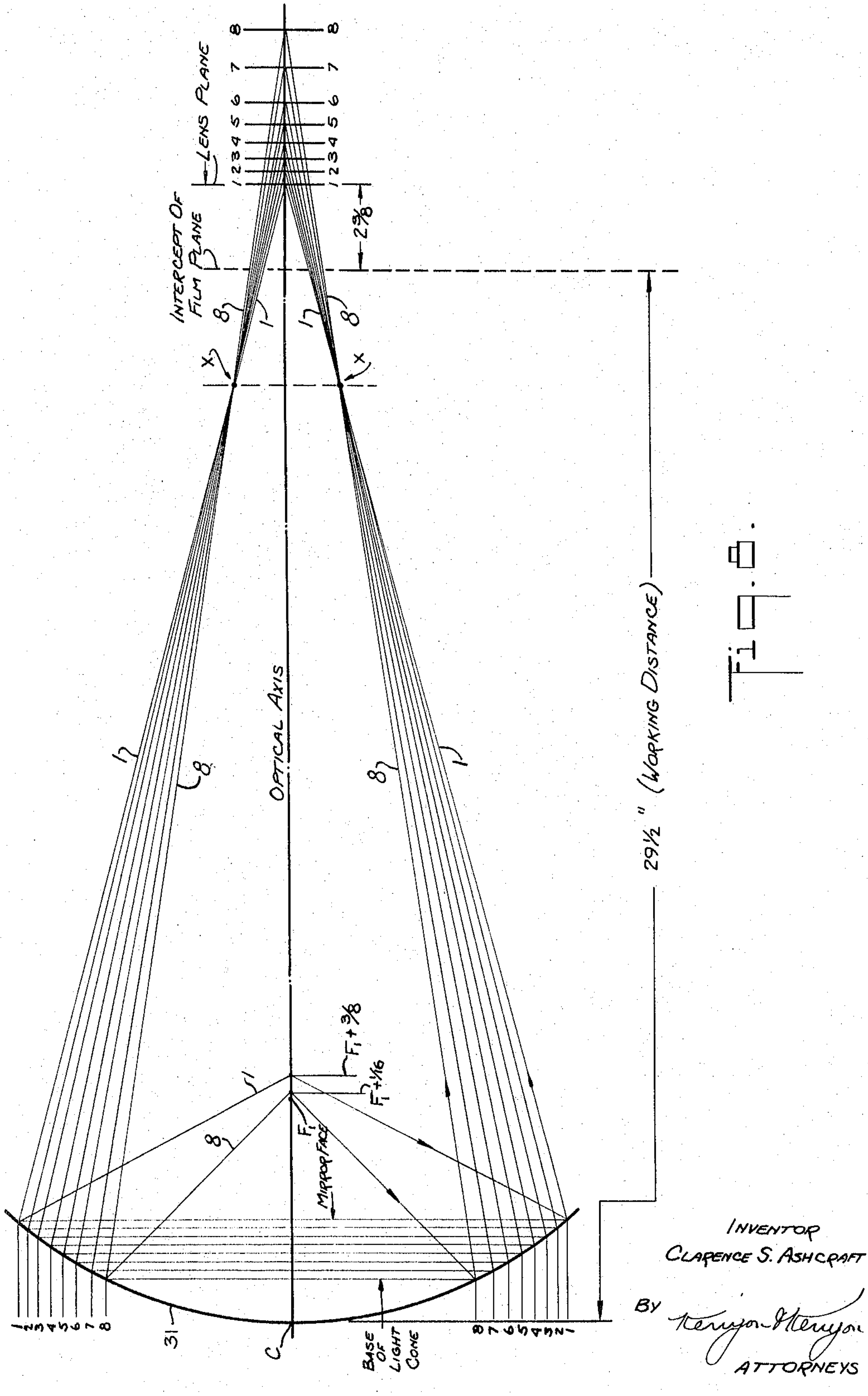
FIG. 8 is an optical schematic illustrating the over-all operation of this invention; this schematic is drawn so that the dimensions are in correct proportion.

As may be seen in FIGS. 3 and 8, the further the crater face 35 is backed away from the geometric focus $F_1$, the greater will be the diameter of the light from the gas disk on the mirror 31 and, consequently, the greater will be the angle of convergence as the light is projected by the mirror 31 toward the film 36. For the aperture 32 location illustrated there is an inverse ratio between gas disk image on the mirror 31 and the size of the light cone at the aperture 32 plane. The larger the gas disk light diameter on the mirror 31, the smaller will be the diameter of the cone of light at the aperture 32 plane. All of this means that the position of the crater face 35 can be adjusted to exactly fill the aperture 32 with the converging beam of cerium core 35B produced white light. An important consequence of this adjustment is that the distribution of light on the screen may be adjusted and a far more even screen illumination obtained.

The reason for the inverse relationship between the size of the gas disk on the mirror 31 and the size of the area illuminated by the gas disk light at the aperture frame 32F is that the converging angle of the cone of light is greater as the mirror 31 image increases. The film 36 plane intercepts the cones of light at a location sufficiently far removed from the center of the mirror 31 so that the film plane 36 is past the marginal ray crossover intercept X—X for the various cones illustrated in FIG. 8. Thus the position of the carbons can be adjusted to exactly fill whatever film aperture is required with an even distribution of light from the core 35B of the carbon 34. The carbons 33, 34 can be adjusted so that a minimum amount of this most desired portion of the light emitted by the arc is lost on the aperture frame 32F.

Figure 6:
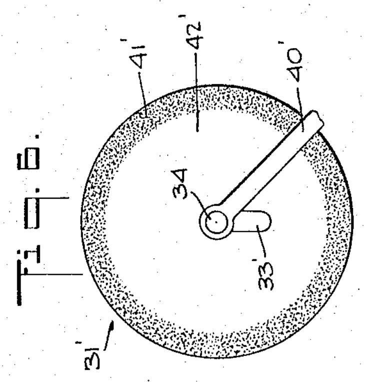
FIG. 6 is adapted from a photograph of a pin hole projection of the ellipsoidal mirror surface when the face of the cerium core gas emanations is at position C of FIG. 3.
Figure 5:
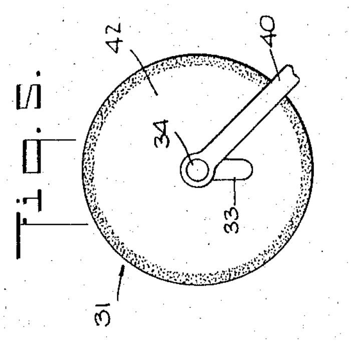
FIG. 5 is adapted from a photograph of a pin hole projection of the ellipsoidal mirror surface when the face of the cerium core gas emanations is at position B of FIG. 3.
Figure 4:
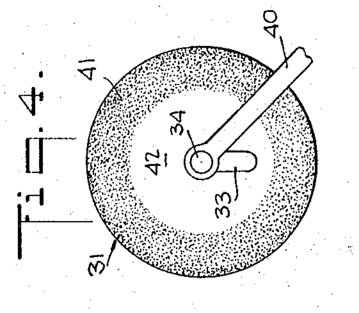
FIG. 4 is adapted from a photograph of a pin hole projection of the ellipsoidal mirror surface when the face of the cerium core gas emanations is at position A of FIG. 3.

FIGS. 4, 5, and 6 illustrate the effect of varying the crater 35 position on the size of the gas disk image at the mirror 31. These three figures are adapted from photographs. The mirror 31 image is too bright to directly view or photograph. Thus a projection of the mirror 31 surface was obtained by making a pin hole in the aperture frame 32F and the picture thereby projected was photographed. These pictures from the basis for the proportional schematic drawing of FIG. 8. The light area 42 represents the portion of the mirror 31 surface that is illuminated by light from the gas disk, and the outer dark area 41 represents the portion of the mirror surface that is not illuminated by the gas disk. In FIG. 4, the crater 35 is closest to the mirror and in FIG. 6 the crater 35 is furthest from the mirror 31. In each figure, the device used to hold the positive carbon 34 is shown by the area 40.

One experiment was run to demonstrate the relationship between carbon position, spot size on the mirror, and screen light intensity. An experimental projection system was set up in which the aperture frame 32F was located 29.5 inches from the center C of the mirror (the actual distance measurement was made from the back surface of the mirror 31 to the front surface of the aperture frame 32F). The frame 32F and lens 37 were built to pivot out of the way so that they could be replaced by a pin hole aperture. The pin hole aperture had a target bracketed to it and spaced from it by 5¾ inches. A screen was permanently located along the projection axis at a typical projection distance (across the room).

To take the following data, a 70 mm. aperture 32 was used and the carbons 33, 34 adjusted to give 100% light distribution across the screen. This resulted in a 90 ft.-candle reading at both edges and at the center of the screen. The frame 32F was pivoted out of the way and the pin hole aperture pivoted into place at the same position as had been held by the aperture frame 32F. The target then showed a picture similar to FIG. 4. The bright portion 42 was measured, the arc turned off and the distance between the back of the mirror 31 and the rim of the positive carbon 34 measured. The carbon 34 was then drawn back in 1/32 inch units and at each point screen illumination and target spot size readings taken. The following results were obtained:

| Positive Carbon 34 Position (Inches From Back of Mirror) | Screen Center Illumination (Ft.-Candles) | Spot Size On Target (Diameter In Inches) |
|---|---|---|
| 6 18/32 | 90 | 1 9/16 |
| 6 19/32 | 94 | 1 11/16 |
| 6 20/32 | 115 | 1 13/16 |
| 6 21/32 | 145 | 1 15/16 |
| 6 22/32 | 165 | 2 1/16 |
| 6 23/32 | 185 | 2 6/16 |
| 6 24/32 | 225 | 2 12/16 |
| 6 25/32 | 265 | 3 |
| 6 26/32 | 320 | 3 4/16 |

in which:

The carbon 34 distances were measured from the back of the mirror 31 center C to the rim of the carbon 34.

Screen illumination is a single reading on a foot-lambert meter at the center of the screen.

The spot size refers to the bright center portion of the image on the target and thus represents the gas disk image. The shell 35A light also showed up as an illumination of the rest of the 16-inch mirror 31 and measured a constant 3 7/16 inches. Thus the portion of the mirror 31 illuminated by the cerium core 35B can be calculated by taking the ratio between the measured target spot size and 3 7/16 inches. That ratio multiplied by 16 inches will give the diameter of the gas disk image on the mirror 31.

FIG. 8 schematically illustrates what the above table demonstrates.

Measurements have shown that the system 30 can be used to provide as even a distribution of light on the screen as may be desired and that in a practical embodiment, in which it is desired to maintain as much light efficiency as possible, the distribution of light on the screen can be improved to the point where the light intensity at the edges of the screen is 80% of the light intensity at the center of the screen as contrasted with the prior art figures of 55 to 65%.

This new system 30 provides better light distribution because it breaks away from the necessity of focusing the crater face 35 at or near the secondary focus $F_2$. Thus the light beam incident on the aperture 32 may be adjusted to entirely fill the film aperture 32 and that light beam is the white light from the crater face which is collected and reflected by the mirror 31.

In obtaining the above table, the carbons 33, 34 were initially adjusted to provide even screen illumination through a 70 mm. aperture. This meant that the light cone completely filled the 70 mm. aperture. As the carbon 34 was drawn back and the other readings taken, it was obvious that the area of the screen filled by the gas disk light decreased.

In the prior art, the exact position of the film plane 16 and of the crater face 15 was determined pretty much by cut and try methods. A balance had to be struck between light distribution, light intensity, and proper resolution. The compromise arrived at in the prior art caused an adulteration of the pure white light that was emitted by the cerium core 15B so that the light at the aperture 12 had mixed into it a great deal of the light emitted by the carbon shell 15A. Thus the light obtained at the film 16 plane was not nearly as white nor as bright as is obtained by the system of this invention. As an example of the difference in illumination obtained in the two systems, the following test was run:

| Working Distance, inches | Position of Crater Rim, inches | Light Intensity At Center of Screen, ft.=lamberts |
|---|---|---|
| 29½ | 6 13/16 | 330 |
| 36¾ | 6⅜ | 225 |

In the above comparison the arc current was kept constant (at approximately 95 amperes), the distance of the screen from the aperture 32 was kept constant and the same projection lens 37 was used. The first set of readings was run by putting a large aperture (in this case a 70 mm. aperture) at a distance of 29½ inches from the center C of the mirror and then adjusting the position of the carbons 33, 34 to obtain maximum illumination as read by a ft.-lambert meter positioned at the center of the screen on which the light was projected. The arc was then turned off and the position of the crater 35 rim of the positive carbon 34 was measured from the center C of the mirror. To obtain the second line of readings, the same procedure was followed except that the working distance of 36¾ inches was selected as representative of the working distances of the prior art systems. Then again the carbons were adjusted to obtain the maximum illumination on the very same ft.-lambert meter located at exactly the same position on the same screen. The maximum possible illumination was read as 225 ft.-lamberts and the arc turned off. The distance from the center C of the mirror 31 to the positive carbon 34 was measured. From this experiment it can be seen that the prior art system 10 resulted in providing a light that was considerably less intense than can be obtained by the system 30 of this invention. The system of this invention repudiated the approach of the prior art, and moved the working distance in towards the mirror and moved the position of the positive carbon out away from the mirror past the geometric focus $F_1$.

This new projection system 30, because of its more efficient use of light and better distribution of light over the aperture 32, permits operation of the carbons 33, 34 with a smaller current drain. The saving of electric current results in a cost saving not only in that less current is used but in that the rate at which the positive carbon 34 is consumed is greatly decreased. In some installations, installation cost may be decreased because a rectifier can be used in lieu of a motor generator set.

Figure 2A:
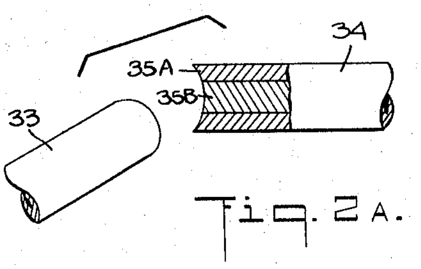
FIG. 2A is an enlarged longitudinal cross section of the carbons in FIG. 2, showing the crater developed during operation of the system of this invention.

It also seems to be the case that the lower current required results in a crater 35 which is shallower than the crater 15 evident in the prior art system 10. FIG. 2A can be contrasted with FIG. 1A to, in a rough schematic way, illustrate the difference in crater depth. Because the crater 35 that is created in the positive carbon 34 in this new system 30 is shallower than previously, the gas disk is not quite so buried in the crater and presumably a somewhat larger portion of the light emitted by the gas disk impinges on the mirror 31 adding to the total light available. In this fashion, the device of this invention by making a more efficient use of the light available brings about a condition which appears to increase the total amount of light available and thus further increase efficiency.

A further consequence of the more efficient use of light and lower arc current densities required is that projectors using the new system need not use the expensive cold reflectors that are required in the larger theaters where the only way to get greater light output in the prior art is to increase arc current.

Figure 7:
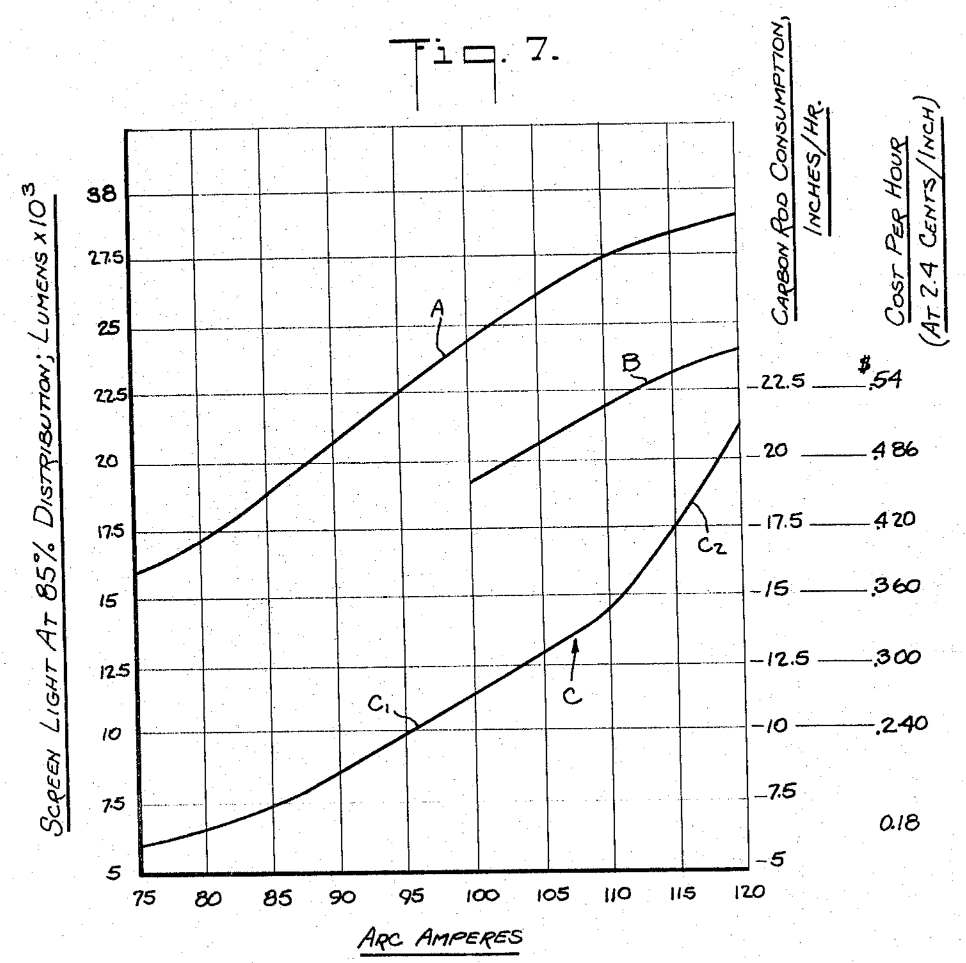
FIG. 7 is a chart comparing the economy and efficiency of the invention with the prior art.

The economy that is obtained by the use of this invention may be illustrated by reference to FIG. 7. In FIG. 7, curves A and B illustrate total illumination received at a screen as a function of carbon arc amperes. Curve A represents illumination received using this invention. Curve B illustrates the relationship in the prior art systems. Both curves A and B are taken using a 35 mm. aperture 12. Curve C demonstrates the relationship between the rate of consumption of the positive carbon rod 34 as a function of carbon amperes. The cost per hour of use is also listed as an alternate ordinate. Curve C is the same for the system of this invention as well as for the prior art since carbon consumption is strictly a function of amperes. However, FIG. 7 illustrates that for a given total illumination on the screen considerably less arc current is needed and thus the rate of positive carbon consumption and cost is considerably decreased.

Curve C has a sharply ascending portion $C_2$ toward the right as carbon current goes above 110 amps. In many installations it is possible to reduce carbon current from above 110 amps. to below 110 amps. by substitution of the invention for the prior art while at the same time increasing total screen illumination. In such installations the saving is quite considerable since the rate of carbon consumption increases quite rapidly above 110 amps.

The compression of the distance between the mirror 31 and the lens 37 in the invention 30 calls for a lamp housing appreciably shorter than has hitherto been necessary. In this art, the lamp housing contains the mirror 31 and carbons 33, 34. The lamp (housing plus contents) is then attached to another housing containing the aperture frame 32F and lens structure 37. The front opening of the lamp housing is designed to be at a distance from the mirror that is fairly close to the aperture frame 32F so that as long a positive carbon rod 34 as is possible may be enclosed in the housing and therefore minimize the number of times the positive carbon rod 34 has to be replaced. In the prior art the distance from the center C of the mirror 31 to the light opening in the housing was typically 27 inches. In one lamp built to embody this invention in a 35 mm. system the distance from the center of the mirror to the light opening was 23½ inches. It is important then that the lamp housing length be redesigned in equipment that is to be used in accordance with the teachings of this invention.

Apart from the lamp housing, the other elements of the system such as the mirror 31, the aperture frame 32F and the lens 37 need not be specially redesigned. It may be possible to use a smaller diameter mirror 31 or lens 37 that has a slower speed than was otherwise necessary. But such redesigned features are not necessary and are not called for in the practice of this invention. Lamp length is the only equipment parameter which must be redesigned in accordance with the teachings of this invention.

Where dimensions have been discussed above, they have been dimensoions which would be found in a 35 mm. projection system. This invention was originally designed for use with a 35 mm. projection system and the preferred embodiment of this invention, at the time of submitting this application, is in a 35 mm. projection system. However, there is no reason why the teachings of this invention could not be adapted to projection systems for other than 35 mm. film. One adaptation to a 70 mm. projection system appears to provide many, if not all, of the advantages above described.

In connection with an understanding of the drawings, it should be remembered that the drawings, apart from FI.G 8, are not entirely to scale but are shown schematically in a fashion that would render the invention most readily comprehensible.

What is claimed is:

1. A film projection system comprising an ellipsoidal mirror segment with a first focal point and a second focal point along its axis, said first focal point being spaced about ⅙ as far from said mirror as said second focal point, said mirror segment being used for reflecting a cone of substantially homogenously distributed light, high intensity light source means movable along said axis for increasing and decreasing the area of the mirror used for reflecting, said light source means increasing the angle of said cone as said means is moved away from said first focal point toward said second focal point, and an aperture frame for a film positioned on said axis about ⅚ of the distance from said mirror to said second focal point, whereby said light source means may be adjusted toward said first focal point to a position where the reflected light cone will just cover the entire aperture with minimum peripheral loss on said aperture frame around said aperture.

2. A film projection system as defined in claim 1, and a projection lens spaced from said film aperture at a distance from said mirror less than the apex of said reflected light cone, whereby the entire light cone passing through said film may be intercepted by said lens.

3. A film projection system as defined in claim 2, said high intensity type source of light being an arc-light wherein the positive carbon has a core comprising a mixture of compounds of the cerium group of earth metals with carbon.

4. A film projection system as defined in claim 3, the spacing of the first focal point from the mirror being 6.5″, and the second focal point, 36″, the spacing of said aperture frame being 29.5″, whereby an adjustment range of the arc-light of half an inch will reduce the area of the mirror used for reflection of the light source from a diameter of 16″ to 9.5″ with a corresponding increase in the diameter of the light cone area intercepted at the aperture frame from 1.125″ to 2.312″.

References Cited by the Examiner

UNITED STATES PATENTS

| | | | |
|---|---|---|---|
| 1,275,120 | 8/1918 | Ballman et al. | 88—24 |
| 1,282,224 | 10/1918 | Hardyman. | |
| 1,698,096 | 1/1929 | Hirschfield | 88—24 X |
| 1,750,910 | 3/1930 | Stark | 88—24 |
| 1,763,630 | 6/1930 | Hopkins. | |
| 1,774,964 | 9/1930 | Dewey | 313—354 |
| 2,225,035 | 12/1940 | Cook | 88—24 |
| 2,819,649 | 1/1958 | McLeod et al. | 88—57 X |

JULIA E. COINER, *Primary Examiner.*

NORTON ANSHER, *Examiner.*

V. A. SMITH, *Assistant Examiner.*